(12) United States Patent
Niu et al.

(10) Patent No.: US 9,736,090 B2
(45) Date of Patent: Aug. 15, 2017

(54) METHOD AND APPARATUS FOR PROCESSING MESSAGE

(71) Applicant: Xiaomi Inc., Beijing (CN)

(72) Inventors: Kun Niu, Beijing (CN); Xinyu Liu, Beijing (CN); Jian Zeng, Beijing (CN)

(73) Assignee: Xiaomi Inc., Beijing (CN)

( * ) Notice: Subject to any disclaimer, the term of this patent is extended or adjusted under 35 U.S.C. 154(b) by 266 days.

(21) Appl. No.: 14/132,599

(22) Filed: Dec. 18, 2013

(65) Prior Publication Data

US 2014/0108579 A1 Apr. 17, 2014

Related U.S. Application Data

(63) Continuation of application No. PCT/CN2013/079295, filed on Jul. 12, 2013.

(30) Foreign Application Priority Data

Sep. 25, 2012 (CN) .......................... 2012 1 0360867

(51) Int. Cl.
*H04L 12/58* (2006.01)
*G06Q 10/10* (2012.01)

(52) U.S. Cl.
CPC ............ *H04L 51/046* (2013.01); *H04L 12/58* (2013.01); *H04L 51/04* (2013.01); *G06Q 10/107* (2013.01); *H04L 12/581* (2013.01); *H04L 12/582* (2013.01); *H04L 12/588* (2013.01)

(58) Field of Classification Search
CPC ...... G06Q 10/107; H04L 12/58; H04L 12/581; H04L 12/582; H04L 12/588; H04L 51/04; H04L 51/046; H04M 1/72552
See application file for complete search history.

(56) References Cited

U.S. PATENT DOCUMENTS

| | | | |
|---|---|---|---|
| 2003/0091167 A1* | 5/2003 | Hirai ................... | G06Q 10/107 379/93.01 |
| 2006/0148496 A1 | 7/2006 | Zhu et al. | |
| 2008/0090597 A1* | 4/2008 | Celik ..................... | H04W 4/14 455/466 |
| 2009/0092233 A1* | 4/2009 | Meli ................. | H04M 1/72552 379/88.11 |
| 2009/0153909 A1* | 6/2009 | Smith ................ | H04N 1/00209 358/402 |
| 2012/0157066 A1* | 6/2012 | Hwang ........... | H04M 1/274516 455/414.2 |

FOREIGN PATENT DOCUMENTS

| | | |
|---|---|---|
| CN | 101335954 A | 12/2008 |
| CN | 101873557 | 10/2010 |
| CN | 102421073 | 4/2012 |
| CN | 102958020 | 3/2013 |

* cited by examiner

*Primary Examiner* — Arvin Eskandarnia
*Assistant Examiner* — Gil H. Lee
(74) *Attorney, Agent, or Firm* — Finnegan, Henderson, Farabow, Garrett & Dunner LLP (57) ABSTRACT

A method for a mobile terminal to process a message, including: receiving a message, the message including a sender identification for a sender of the message and communication information; and updating an address book locally stored in the mobile terminal based on the sender identification and the communication information.

13 Claims, 7 Drawing Sheets

| 1 | Dial |
|---|---|
| 2 | Send A Short Message |
| 3 | Copy |
| 4 | Create A New Contact |
| 5 | Add To A Contact |
| 6 | Add As A New Number Of Joe Smith |
| 7 | Replace A Number Of Joe Smith |
| 8 | Create A New Contact For Joe Smith |

METHOD AND APPARATUS FOR PROCESSING MESSAGE

CROSS REFERENCE TO RELATED APPLICATIONS

The present application is a continuation of International Application No. PCT/CN2013/079295, filed Jul. 12, 2013, which is based upon and claims priority of Chinese Patent Application No. 201210360867.9, filed Sep. 25, 2012, the entire contents of which are incorporated herein by reference.

TECHNICAL FIELD

The present disclosure generally relates to the technical field of mobile communication and, more particularly, to a method and an apparatus for processing a message.

BACKGROUND

Conventionally, when a user of a mobile phone changes communication information, such as a telephone number or a home address, the user can inform the user's contacts of new communication information by using the mobile phone to send a message regarding the change. When a recipient receives the message, the recipient generally reads the message, memorizes the new communication information in the message, and then manually switches the mobile phone to an address book. The recipient may also need to search manually for the sender's name in the address book. The recipient then re-edits the sender's communication information in the address book to be the new communication information, and saves the new communication information.

SUMMARY

According to a first aspect of the present disclosure, there is provided a method for a mobile terminal to process a message, comprising: receiving a message, the message including a sender identification for a sender of the message and communication information; and updating an address book locally stored in the mobile terminal based on the sender identification and the communication information.

According to a second aspect of the present disclosure, there is provided a mobile terminal, comprising: a processor; and a memory for storing instructions executable by the processor, wherein the processor is configured to: receive a message, the message including a sender identification for a sender of the message and communication information; and update an address book locally stored in the mobile terminal based on the sender identification and the communication information.

According to a third aspect of the present disclosure, there is provided a non-transitory computer-readable medium having stored therein instructions that, when executed by a processor of a mobile terminal, causes the mobile terminal to perform: receiving a message, the message including a sender identification for a sender of the message and communication information; and updating an address book locally stored in the mobile terminal based on the sender identification and the communication information.

It is to be understood that both the foregoing general description and the following detailed description are exemplary and explanatory only and are not restrictive of the invention, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
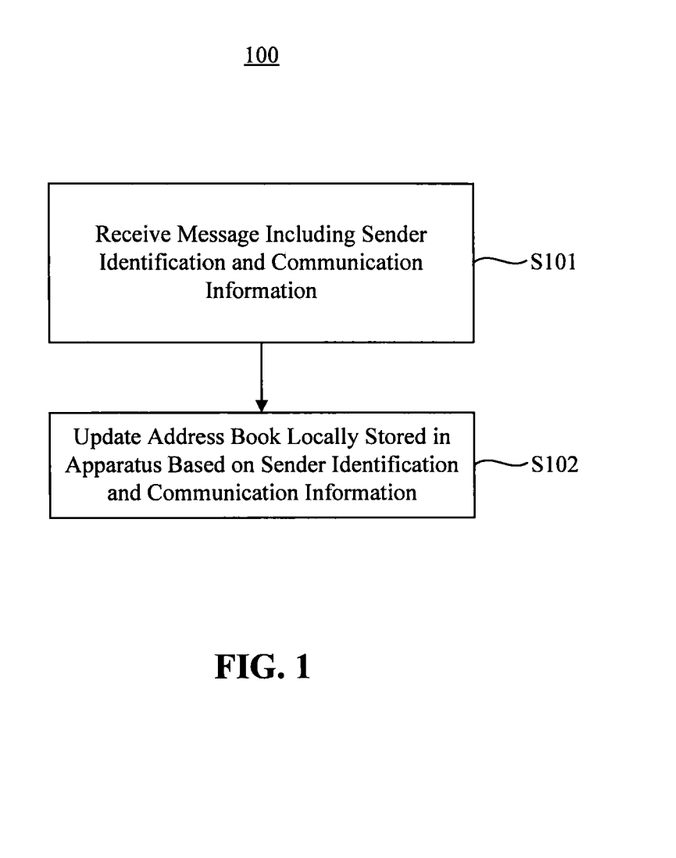
FIG. 1 is a flowchart of a method for an apparatus to process a message, according to an exemplary embodiment.

FIG. 1 is a flowchart of a method 100 for an apparatus, such as a mobile terminal, to process a message, according to an exemplary embodiment. Referring to FIG. 1, the method 100 includes steps S101 and S102.

In step S101, the apparatus receives a message sent from another device, the message including a sender identification for a sender of the message and communication information.

In exemplary embodiments, the message can be a short message from a mobile phone, an instant messaging (IM) message, an E-mail, or a Social Networking Services (SNS) message. Correspondingly, the sender identification can be a telephone number, an IM number, an E-mail address, or an SNS account of the sender.

In exemplary embodiments, the communication information can include at least one of a contact, a telephone number, a network account for communication, a mail address, or a personal profile. For example, the network account for communication can be an IM account, an SNS account, etc. Also for example, the mail address can be a residential address, a company address, or an E-mail address. Further for example, the personal profile can include a personal avatar, a work or study place, a job title, hobbies, etc.

Still referring to FIG. 1, in step S102, the apparatus updates an address book locally stored in the apparatus based on the sender identification and the communication information. For example, the address book is a database for storing communication information of contacts.

In exemplary embodiments, in performing step S102, the apparatus performs a query on a store status of the sender identification and the communication information in the address book, and updates the address book based on a result of the query. For example, the apparatus determines whether the sender identification is present in the address book. If it is determined that the sender identification is present in the address book, the apparatus further determines if the communication information in the received message includes a contact.

If it is further determined that the communication information in the received message does not include a contact, the apparatus adds the communication information into an address book entry of a contact corresponding to the sender identification in the address book or, alternatively, replaces content in the address book entry of the contact corresponding to the sender identification with the communication information.

If it is further determined that the communication information in the received message includes a contact and the included contact is not present in the address book, the apparatus creates a new address book entry for the included contact in the address book and stores the communication information in the newly created address book entry. In one exemplary embodiment, the communication information is received in a predetermined format, and the apparatus directly imports the communication information into the address book.

In exemplary embodiments, to replace the content in the address book entry of the contact corresponding to the sender identification with the communication information, the apparatus determines whether there are contents of the same type in the communication information and in the address book of the contact. For instance, if both contents are telephone numbers, or mailing addresses, or personal profiles, etc., the apparatus determines they are of the same type.

In exemplary embodiments, if it is determined that there are contents of the same type in the communication information and in the address book of the contact, the apparatus further determines whether the contents of the same type are consistent. If it is determined that the contents of the same type are consistent, the apparatus adds only contents in the communication information that are of a different type from any contents in the address book of the contact into the address book of the contact. If it is determined that the contents of the same type are inconsistent, the apparatus replaces the content in the address book of the contact with the content of the same type in the communication information.

In exemplary embodiments, if it is determined that the sender identification in the received message is not present in the address book, the apparatus further determines if the communication information in the received message includes a contact. In one exemplary embodiment, the apparatus determines that the communication information includes a contact and the included contact is present in the address book. Accordingly, the apparatus adds the sender identification and the communication information into the address book entry corresponding to the contact or, alternatively, replaces content in the address book entry corresponding to the contact with the sender identification and the communication information. In one exemplary embodiment, the apparatus determines that the communication information includes a contact but the contact is not present in the address book. Accordingly, the apparatus creates a new address book entry corresponding to the contact in the address book, and stores the sender identification and the communication information in the new address book entry.

The method 100 for processing a message reduces manual operations of a user of the apparatus when updating the address book, by receiving the message including the sender identification for the sender and the communication information, and then updating the address book locally stored in the apparatus according to the sender identification and the communication information.

Figure 2:
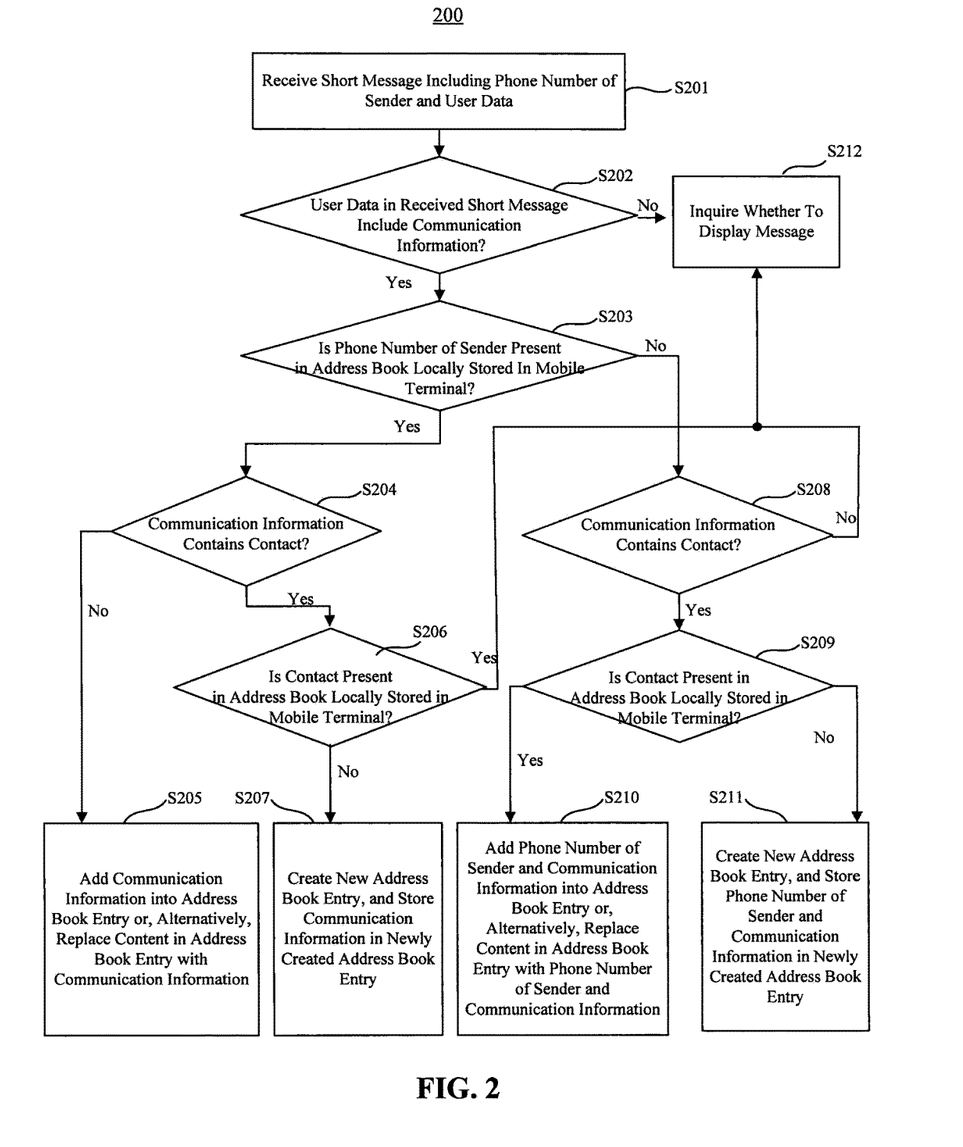
FIG. 2 is a flowchart of a method for a mobile terminal to process a message, according to an exemplary embodiment.

FIG. 2 is a flowchart of a method 200 for a mobile terminal to process a message, according to an exemplary embodiment. Referring to FIG. 2, the method 200 includes the following steps.

In step S201, the mobile terminal receives a short message sent from another mobile terminal. For example, the short message is received through a short message service (SMS), and includes a telephone number of a sender and user data.

In step S202, the mobile terminal determines whether the user data in the received short message includes communication information. If it is determined that the user data includes communication information, the mobile terminal performs step S203. If it is demined that the user data does not include communication information, the mobile terminal inquires of the user whether to display the received short message (S212), and displays the received short message upon receiving an instruction for display issued by the user.

In step S203, the mobile terminal further determines whether the telephone number of the sender is present in an address book locally stored in the mobile terminal. If it is determined that the telephone number of the sender is present in the address book, the mobile terminal performs step S204 or, alternatively, if it is further determined that the communication information is in a predetermined format, the mobile terminal directly imports the communication information into the address book (not shown). Otherwise, if the mobile terminal determines that the telephone number of the sender is not present in the address book, the mobile terminal performs step S208.

In step S204, the mobile terminal extracts communication information from the user data, and determines whether the communication information contains a contact. If it is determined that the communication information does not contain a contact, the mobile terminal determines that the received short message is a message from the sender regarding a change of the sender's communication information, and performs step S205; otherwise, the mobile terminal performs step S206.

In step S205, the mobile terminal adds the communication information into the address book entry of the contact corresponding to the telephone number of the sender or, alternatively, replaces content in the address book entry of the contact corresponding to the telephone number of the sender with the communication information, similar to the above description in connection with FIG. 1.

In step S206, the mobile terminal determines whether the contact is present in the address book. If it is determined that the contact is not present in the address book, the mobile terminal determines that the received short message is a message from the sender regarding communication information of a third party, and performs step S207. Otherwise, the mobile terminal performs step S212.

In step S207, the mobile terminal creates a new address book for the contact in the address book, and stores the communication information in the new address book entry.

As noted above, if the mobile terminal determines that the telephone number of the sender is not present in the address book in step S203, the mobile terminal performs step S208. In step S208, the mobile terminal extracts communication information from the user data in the received message, and determines whether the communication information contains a contact. If it is determined that the communication information contains a contact, the mobile terminal performs step S209. Otherwise, the mobile terminal performs step S212.

In step S209, the mobile terminal further determines whether the contact is present in the address book. If it is determined that the contact is present in the address book, the mobile terminal determines that the received short message is a message from the sender regarding a change of the sender's communication information, and performs step S210. If it is determined that the contact is not present in the address book, the mobile terminal determines that the received short message is a message from a new contact regarding the new contact's communication information, and performs step S211.

In step S210, the mobile terminal adds the telephone number of the sender and the communication information into the address book entry corresponding to the contact or, alternatively, replaces contents in the address book entry corresponding to the contact with the telephone number of the sender and the communication information.

In step S211, the mobile terminal creates a new address book entry for the contact in the address book, and stores the telephone number of the sender and the communication information in the new address book entry.

In one exemplary embodiment, the sender is a contact that is stored in the address book of the mobile terminal of the user, and when the sender changes a current telephone number, the sender can send a short message using the current telephone number, such as 1357654321, that is stored, to inform the user of the sender's changing of the current telephone number. Accordingly, in the illustrated embodiment, the sender identification in the short message is the sender's current telephone number, and the user data in the short message can be "This is my new telephone number, 1341234567, please store it, and the current number will not be used."

The mobile terminal receives the short message sent by the sender, parses the user data "This is my new telephone number, 1341234567, please store it, and the current number will not be used" in the received short message to obtain the communication information to be a telephone number "1341234567." The mobile terminal also performs a query in the address book locally stored in the mobile terminal, to determine whether a contact corresponding to the sender's telephone number "1357654321," i.e., the sender's identification, is stored in the address book. If it is determined that the contact "Joe Smith" corresponding to the sender's telephone number "1357654321" is stored in the address book, the mobile terminal determines that the received short message is a message from the sender informing of a change of the sender's telephone number. Accordingly, the mobile terminal adds the communication information "1341234567" into the address book entry corresponding to "Joe Smith" in the address book. Alternatively, the mobile terminal replaces the sender's current telephone number "1357654321" in the address book entry with the communication information "1341234567."

Figure 3:
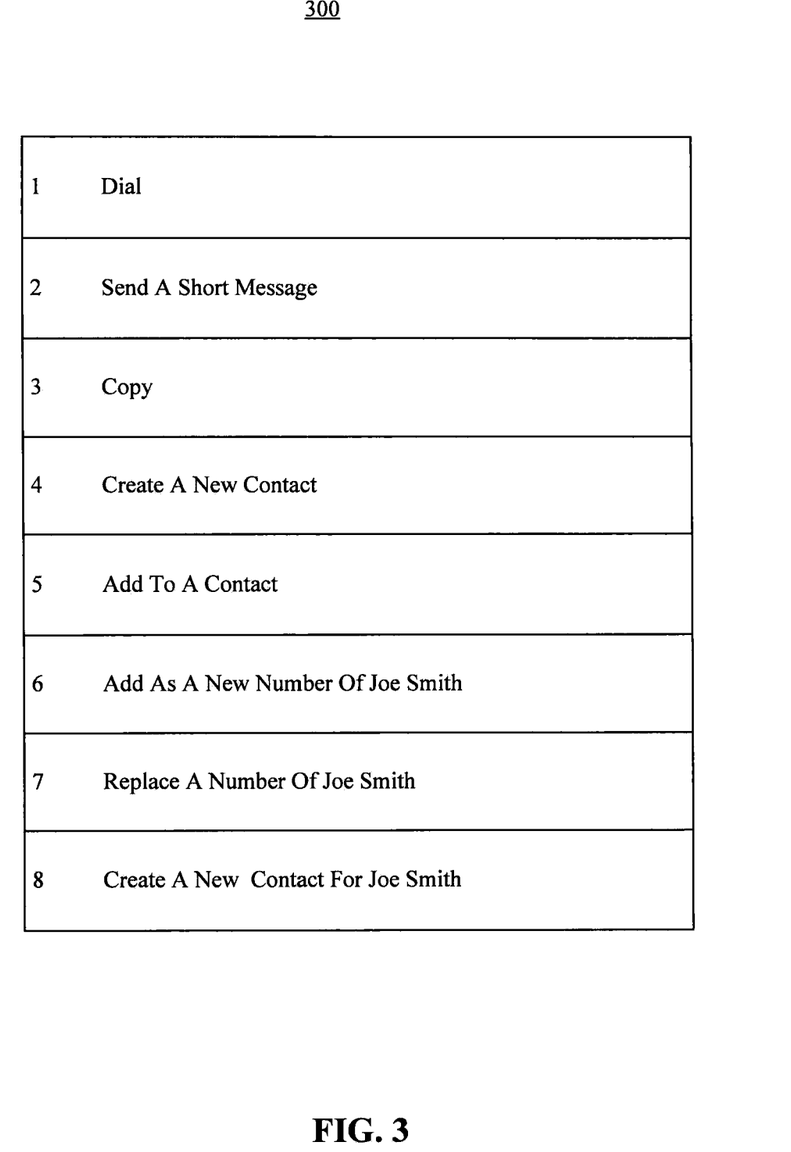
FIG. 3 is a diagram of a prompt box provided by a mobile terminal, according to an exemplary embodiment.

In exemplary embodiments, when the mobile terminal receives a user touch on an area of its screen corresponding to the communication information, such as the telephone number "1341234567" in the short message, a selection prompt box pops up on the screen of the mobile terminal, so that the user can select to add the communication information into the address book entry of the contact corresponding to the telephone number of the sender or, alternatively, replace contents in the address book entry of the contact corresponding to the telephone number of the sender with the communication information.

FIG. 3 shows an exemplary selection prompt box 300 provided by the mobile terminal, according to an exemplary embodiment. For example, in the selection prompt box 300, a sixth option is "Add As A New Number Of Joe Smith," and a seventh option is "Replace A Number Of Joe Smith." If the user touches the screen of the mobile terminal to select the sixth option, the mobile terminal adds the communication information "1341234567" into the address book entry corresponding to "Joe Smith" in the address book. If the user touches the screen to select the seventh option, the mobile terminal replaces the current telephone number "1357654321" corresponding to the contact "Joe Smith" in the address book with the communication information "1341234567." In the illustrated embodiment, the user just needs to perform one selection during updating the address book without the user's operations of searching for contacts and editing the contacts, which simplifies the user's operations.

In one exemplary embodiment, the sender is a contact that is stored in the address book of the mobile terminal, and when the sender changes a current telephone number, the sender sends a short message using a new telephone number, such as "1341234567," that is not in the address book of the mobile terminal, to inform the user of the sender's changing of the current telephone number. In the illustrated embodiment, the sender identification in the short message is the sender's new telephone number, and the user data in the short message can be "I'm Joe Smith, this is my new number, please store it."

The mobile terminal receives the short message sent by the sender, parses the user data "I'm Joe Smith, this is my new number, please store it" in the received short message to obtain the communication information to be the contact "Joe Smith." The mobile terminal also performs a query in the address book locally stored in the mobile terminal, to determine whether the telephone number of the sender "1341234567," i.e., the sender's identification, is stored in the address book. If it is determines that the telephone number of the sender is not present in the address book, the mobile terminal further determines whether the contact "Joe Smith" is present in the address book. If it is determined that the contact "Joe Smith" is present in the address book, the mobile terminal determines that the short message is a message from the sender informing of a change in the sender's telephone number. Accordingly, the mobile terminal adds the new telephone number of the sender "1341234567" into the address book entry to which "Joe Smith" corresponds in the address book. Alternatively, the mobile terminal replaces the current telephone number "1357654321" corresponding to "Joe Smith" in the address book with the new telephone number "1341234567."

In one exemplary embodiment, the sender is a contact that is stored in the address book of the mobile terminal, and the sender informs the user of a third party's communication information by a short message. For example, the sender sends the short message using the sender's telephone number such as "1357654321" that is stored in address book of the mobile terminal of the user, to inform the user of the communication information of the third party, such as "John Doe." Accordingly, in the illustrated embodiment, the sender identification in the short message is the sender's telephone number "1357654321," and the user data in the short message can be "This is the telephone number of John Doe: 1501234567."

The mobile terminal receives the short message sent by the sender, parses the user data "This is the telephone number of John Doe: 1501234567" in the received short message to obtain the communication information "John Doe" and "1501234567." The mobile terminal also performs a query in the address book locally stored in the mobile terminal, to determine whether a contact corresponding to the sender's telephone number "1357654321," i.e., the sender's identification, is stored in the address book. If it is determined that the contact corresponding to the sender's telephone number "1357654321" is stored in the address book, the mobile terminal further determines whether the communication information "John Doe" and "1501234567" is stored in the address book. If it is determined that "John Doe" and "1501234567" are not stored in the address book, the mobile terminal determines that the received short message is a message from the sender informing of a third party's communication information. Accordingly, the mobile terminal creates a new address book entry by the name of "John Doe" in the address book, and stores "1501234567" in the newly created address book entry.

In one exemplary embodiment, the mobile terminal receives the short message, including "John Doe" and "1501234567," in a predetermined format. Accordingly, when the mobile terminal receives the short message in the predetermined format, the mobile terminal determines that the received short message is a message from the sender notifying of a third party's communication information, and directly imports "John Doe" and "1501234567" into the address book.

In one exemplary embodiment, the sender is a contact that is not stored in the address book of the mobile terminal, and the sender can notify the user of the sender's own communication information. For example, the sender sends a short message using a telephone number "1527654321." In the illustrated embodiment, the sender identification in the short message is the sender's telephone number "1527654321," and the user data in the short message can be "I am Daisy, this is my number, please store it and feel free to contact me."

The mobile terminal receives the short message sent by the sender, parses the user data "I am Daisy, this is my number, please store it and feel free to contact me" in the received short message to obtain the communication information "Daisy." The mobile terminal also performs a query in the address book locally stored in the mobile terminal, to determine whether a contact corresponding to the sender's telephone number "1527654321," i.e., the sender's identification, is stored in the address book. If it is determined that there is no contact corresponding to the sender's telephone number "1527654321" stored in the address book, the mobile terminal further determines whether an address book entry corresponding to "Daisy" is stored in the address book. If it is determined that there is no address book entry corresponding to "Daisy" stored in the address book, the mobile terminal determines the received short message is a short message from the sender informing of a new contact's communication information. Accordingly, the mobile terminal creates a new address book entry by the name of "Daisy" in the address book, and stores "1527654321" in the newly created address book entry.

Figure 4:
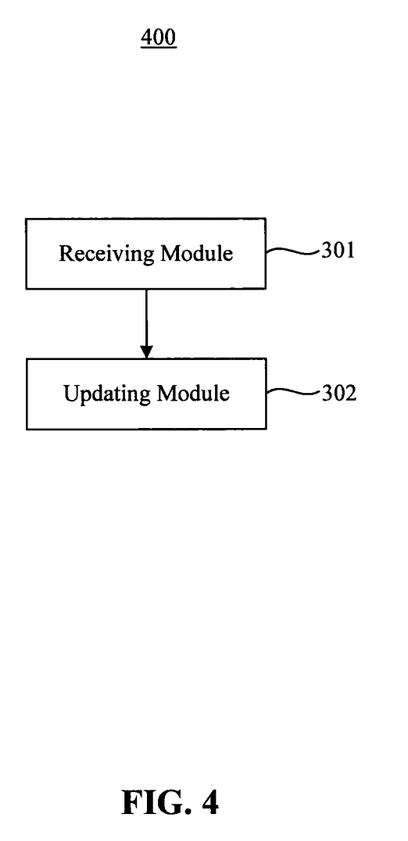
FIG. 4 is a block diagram of an apparatus for processing a message, according to an exemplary embodiment.

FIG. 4 is a block diagram of an apparatus 400 for processing a message, according to an exemplary embodiment. Referring to FIG. 4, the apparatus 400 includes a receiving module 301 and an updating module 302.

In exemplary embodiments, the receiving module 301 is configured to receive a message sent from another device, the message including a sender identification for a sender of the message and communication information.

In exemplary embodiments, the updating module 302 is configured to update an address book locally stored in the apparatus 400 according to the sender identification and the communication information. For example, the updating module 302 performs a query on a store status of the sender identification and the communication information in the address book locally stored in the apparatus 400 and updates the address book based on a result of the query.

Figure 5:
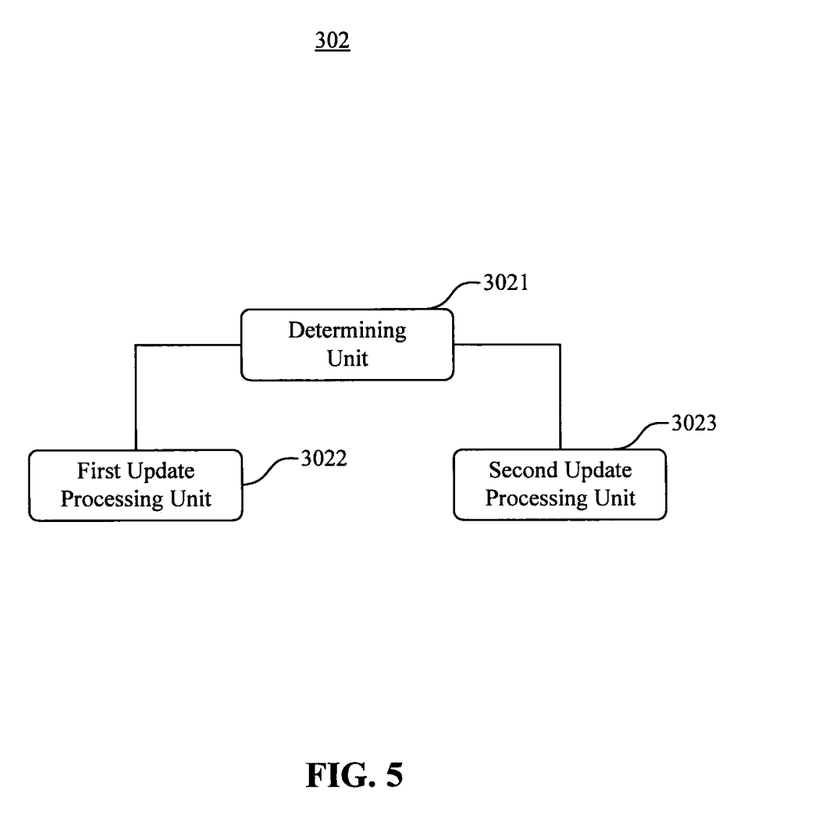
FIG. 5 is a block diagram of an updating module in the apparatus for processing a message, according to an exemplary embodiment.

FIG. 5 is a block diagram of the updating module 302 in the apparatus 400 (FIG. 4), according to an exemplary embodiment. Referring to FIGS. 4 and 5, the updating module 302 includes a determining unit 3021, a first update processing unit 3022, and a second update processing unit 3023.

In exemplary embodiments, the determining unit 3021 is configured to determine whether the sender identification in the message received by the receiving module 301 is present in the address book locally stored in the apparatus 400. The first update processing unit 3022 is configured to, if the determining unit 3021 determines that the sender identification is present in the address book, and if the communication information in the message received by the receiving module 301 does not include a contact, add the communication information into an address book entry of the contact corresponding to the sender identification in the address book or, alternatively, replace content in the address book entry of the contact corresponding to the sender identification with the communication information. The second update processing unit 3023 is configured to, if the determining unit 3021 determines that the sender identification is not present in the address book, and if the communication information received by the receiving module 301 includes a contact and the contact is present in the address book, add the sender identification and the communication information into the address book entry corresponding to the contact or, alternatively, replace content in the address book entry corresponding to the contact with the sender identification and the communication information.

Figure 6:
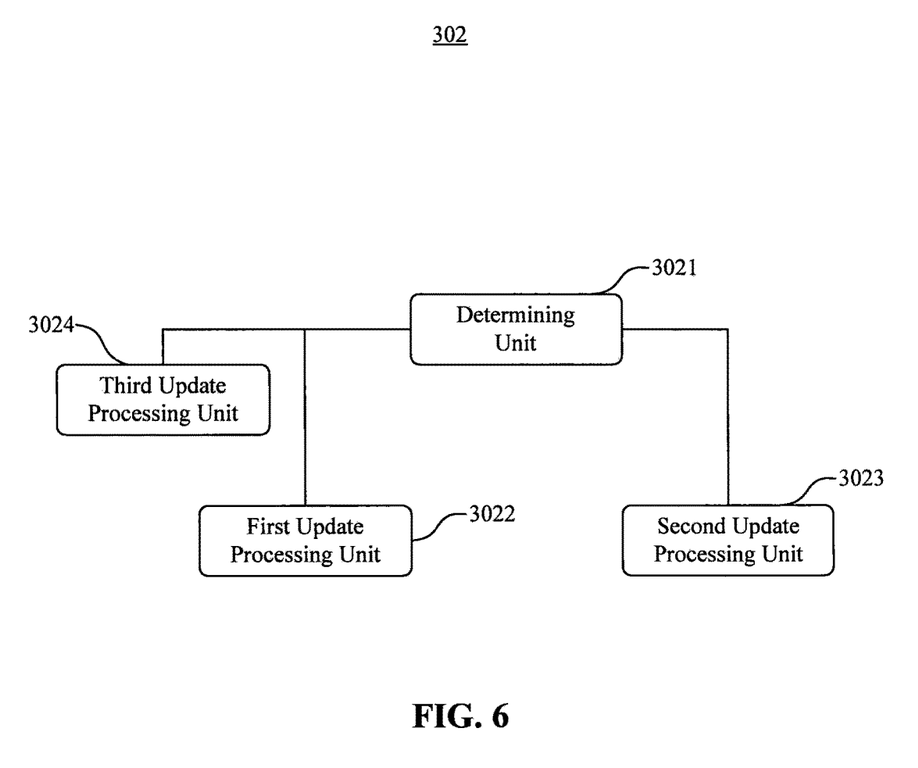
FIG. 6 is a block diagram of an updating module in the apparatus for processing a message, according to an exemplary embodiment.

FIG. 6 is a block diagram of the updating module 302 in the apparatus 400 (FIG. 4), according to an exemplary embodiment. Referring to FIG. 6, in addition to the components illustrated in FIG. 5, the updating module 302 further includes a third update processing unit 3024.

In one exemplary embodiment, the third update processing unit 3024 is configured to, if the determining unit 3021 determines that the sender identification is present in the address book, and if the communication information in the message received by the receiving module 301 includes a contact and the contact is not present in the address book, create a new address book entry for the contact in the address book, and store the communication information in the new address book entry.

In one exemplary embodiment, the third update processing unit 3024 is configured to, if the determining unit 3021 determines that the sender identification is present in the address book, and if the communication information in the message received by the receiving module 301 is in a predetermined format, import the communication information directly into the address book.

In one exemplary embodiment, the third update processing unit 3024 is configured to, if the determining unit 3021 determines that the sender identification is not present in the address book, and if the communication information received by the receiving module 301 includes a contact and the contact is not present in the address book, create a new address book entry for the contact in the address book, and store the sender identification and the communication information in the new address book entry.

One of ordinary skill in the art will understand that the above described modules can each be implemented by hardware, or software, a combination of hardware and software. One of ordinary skill in the art will also understand that the above described modules may be distributed in the apparatus of the embodiment, or may be correspondingly varied to be positioned in one or more apparatuses other than that of the embodiment. Multiple ones of the above described modules may be combined as one module, and each of the above described modules may be further divided into a plurality of sub-modules.

One of ordinary skill in the art will understand that the above described units can each be implemented by hardware, or software, a combination of hardware and software. One of ordinary skill in the art will also understand that the above described units may be distributed in the apparatus of the embodiment, or may be correspondingly varied to be positioned in one or more apparatuses other than that of the embodiment. Multiple ones of the above described units may be combined as one unit, and each of the above described units may be further divided into a plurality of sub-units.

Figure 7:
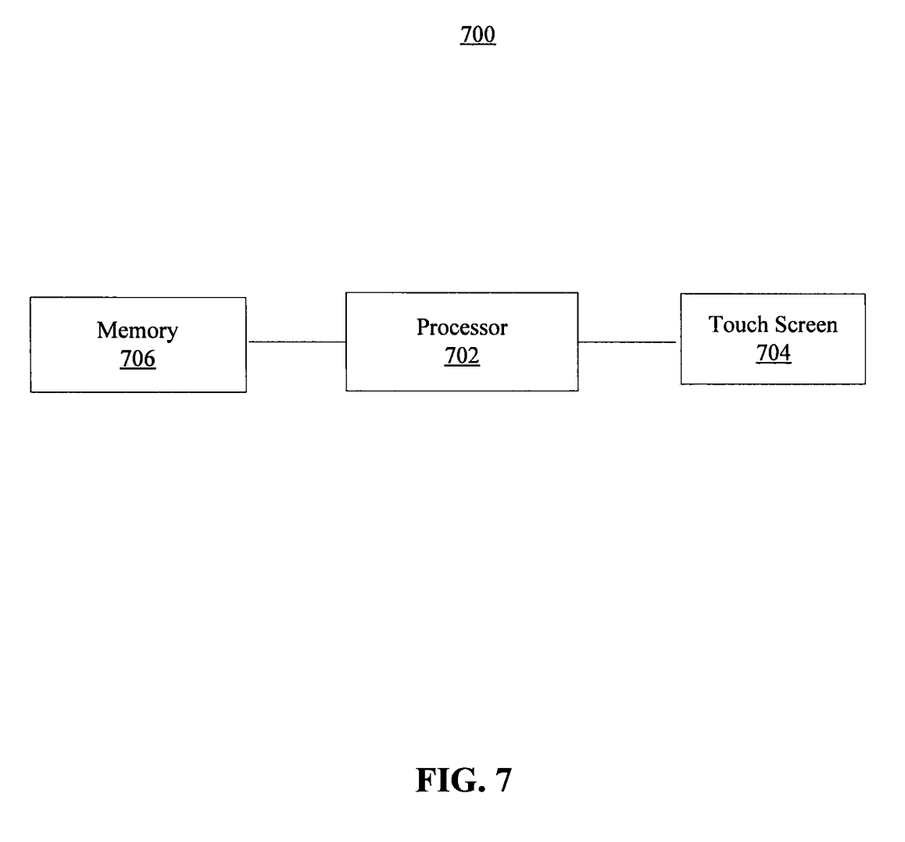
FIG. 7 is a block diagram of a mobile terminal for processing a message, according to an exemplary embodiment.

FIG. 7 is a block diagram of a mobile terminal 700 for processing a message, according to an exemplary embodiment. Referring to FIG. 7, the mobile terminal 700 includes a processor 702 and a touch screen 704. The mobile terminal also includes memory resources, represented by a memory 706 for storing data, such as an address book, as well as for storing program instructions and otherwise facilitating operation of the processor 702.

In exemplary embodiments, there is also provided a non-transitory readable storage medium including instructions, such as included in the memory 706, executable by the processor 702 in the mobile terminal 700, for performing the above-described message processing methods.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a mobile terminal to process a message, comprising:
    receiving a message by a processor of the mobile terminal, the message including a sender identification for a sender of the message, the sender identification being at least one of a telephone number, an instant messaging (IM) number, an E-mail address, or an Social Networking Services (SNS) account of the sender;
    determining, by the processor, whether the received message includes communication information, by determining whether user data in the received message includes at least one of a name of a contact person, a telephone number, a network account for communication, a mailing address, or a contact profile;
    updating, by the processor, an address book locally stored in the mobile terminal based on the sender identification and the communication information, when it is determined that the received message includes the communication information, the address book including one or more address book entries; and
    inquiring, by the processor, whether to display the received message, when it is determined that the received message does not include the communication information,
    wherein the updating of the address book includes:
        determining, based on a query, whether the sender identification is present in the address book;
        when it is determined that the sender identification is present in an existing address book entry of the address book, determining that the communication information includes a name of a contact person and the name of the contact person is not present in the address book;
        creating a new address book entry for the name of the contact person in the address book; and
        storing the communication information in the new address book entry.

2. The method according to claim 1, wherein the receiving of the message comprises:
    receiving at least one of a short message including the telephone number, an IM message including the IM number, an E-mail including the E-mail address, or an SNS message including the SNS account of the sender.

3. The method according to claim 1, wherein when it is determined that the sender identification is present in the existing address book entry of the address book, the method further comprises:
    determining that the communication information does not include a name of a contact person; and
    adding the communication information into the existing address book entry corresponding to the sender identification in the address book.

4. The method according to claim 1, wherein when it is determined that the sender identification is present in the existing address book entry of the address book, the method further comprises:
    determining that the communication information does not include a name of a contact person; and
    replacing content in the existing address book entry corresponding to the sender identification with the communication information.

5. The method according to claim 1, wherein when it is determined that the sender identification is not present in the address book, the method further comprises:
    determining that the communication information includes a name of a contact person and the name of the contact person is present in the address book; and
    adding the sender identification and the communication information into an address book entry corresponding to the name of the contact person.

6. The method according to claim 1, wherein when it is determined that the sender identification is not present in the address book, the method further comprises:
    determining that the communication information includes a name of a contact person and the name of the contact person is present in the address book; and replacing content in an address book entry corresponding to the name of the contact person with the sender identification and the communication information.

7. The method according to claim 1, wherein when it is determined that the sender identification is present in the existing address book entry of the address book, the method further comprises:
  determining that the communication information is received in a predetermined format; and
  importing the communication information directly into the address book.

8. The method according to claim 1, wherein when it is determined that the sender identification is not present in the address book, the method further comprises:
  determining that the communication information includes a name of a contact person and the name of the contact person is not present in the address book;
  creating a new address book entry for the name of the contact person in the address book; and
  storing the sender identification and the communication information in the new address book entry.

9. A mobile terminal, comprising:
  a processor; and
  a memory for storing instructions executable by the processor, wherein the processor is configured to:
  receive a message, the message including a sender identification for a sender of the message, the sender identification being at least one of a telephone number, an instant messaging (IM) number, an E-mail address, or an Social Networking Services (SNS) account of the sender;
  determine whether the received message includes communication information, by determining whether user data in the received message includes at least one of a name of a contact person, a telephone number, a network account for communication, a mailing address, or a contact profile;
  update an address book locally stored in the mobile terminal based on the sender identification and the communication information, when it is determined that the received message includes the communication information, the address book including one or more address book entries; and
  inquire whether to display the received message, when it is determined that the received message does not include the communication information,
  wherein the updating of the address book includes:
    determining, based on a query, whether the sender identification is present in the address book;
    when it is determined that the sender identification is present in an existing address book entry of the address book, determining that the communication information includes a name of a contact person and the name of the contact person is not present in the address book;
    creating a new address book entry for the name of the contact person in the address book; and
    storing the communication information in the new address book entry.

10. The mobile terminal according to claim 9, wherein the processor is further configured to:
  receive at least one of a short message including the telephone number, an IM message including the IM number, an E-mail including the E-mail address, or an SNS message including the SNS account of the sender.

11. The mobile terminal according to claim 9, wherein when it is determined that the sender identification is present in the existing address book entry of the address book, the processor is further configured to:
  determine that the communication information does not include a name of a contact person; and
  add the communication information into the existing address book entry corresponding to the sender identification in the address book.

12. The mobile terminal according to claim 9, wherein when it is determined that the sender identification is present in the existing address book entry of the address book, the processor is further configured to:
  determine that the communication information does not include a name of a contact person; and
  replace content in the existing address book entry corresponding to the sender identification with the communication information.

13. A non-transitory computer-readable medium having stored therein instructions that, when executed by a processor of a mobile terminal, cause the mobile terminal to perform:
  receiving a message, the message including a sender identification for a sender of the message, the sender identification being at least one of a telephone number, an instant messaging (IM) number, an E-mail address, or an Social Networking Services (SNS) account of the sender;
  determining whether the received message includes communication information, by determining whether user data in the received message includes at least one of a name of a contact person, a telephone number, a network account for communication, a mailing address, or a contact profile;
  updating an address book locally stored in the mobile terminal based on the sender identification and the communication information, when it is determined that the received message includes the communication information, the address book including one or more address book entries; and
  inquiring whether to display the received message, when it is determined that the received message does not include the communication information,
  wherein the updating of the address book includes:
    determining, based on a query, whether the sender identification is present in the address book;
    when it is determined that the sender identification is present in an existing address book entry of the address book, determining that the communication information includes a name of a contact person and the name of the contact person is not present in the address book;
    creating a new address book entry for the name of the contact person in the address book; and
    storing the communication information in the new address book entry.

* * * * *